(12) United States Patent
Cherubini et al.

(10) Patent No.: US 9,176,814 B2
(45) Date of Patent: Nov. 3, 2015

(54) DECODING IN SOLID STATE MEMORY DEVICES

(75) Inventors: Giovanni Cherubini, Rueschlikon (CH); Ilias Iliadis, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/822,862

(22) PCT Filed: Sep. 22, 2011

(86) PCT No.: PCT/IB2011/054164
§ 371 (c)(1),
(2), (4) Date: Mar. 13, 2013

(87) PCT Pub. No.: WO2012/042444
PCT Pub. Date: Apr. 5, 2012

(65) Prior Publication Data
US 2013/0179754 A1    Jul. 11, 2013

(30) Foreign Application Priority Data
Sep. 29, 2010   (EP) .................................... 10181705

(51) Int. Cl.
*G11C 29/00* (2006.01)
*G06F 11/10* (2006.01)

(52) U.S. Cl.
CPC ........ *G06F 11/1068* (2013.01); *G06F 11/1048* (2013.01)

(58) Field of Classification Search
CPC ............ G06F 11/1068; G06F 11/1072; G06F 11/1008; G06F 11/1076; G11C 29/00
USPC ......................................................... 714/773
See application file for complete search history.

(56) References Cited

U.S. PATENT DOCUMENTS

| | | | |
|---|---|---|---|
| 2001/0052104 A1* | 12/2001 | Xu et al. ...................... | 714/792 |
| 2003/0101406 A1 | 5/2003 | Song | |
| 2008/0092014 A1 | 4/2008 | Brandman et al. | |
| 2009/0024905 A1 | 1/2009 | Shalvi et al. | |
| 2010/0169734 A1* | 7/2010 | Gamage et al. ............... | 714/752 |
| 2010/0174845 A1* | 7/2010 | Gorobets et al. .............. | 711/103 |
| 2011/0107188 A1* | 5/2011 | Dror et al. ..................... | 714/773 |
| 2011/0113294 A1* | 5/2011 | Chugg et al. .................. | 714/704 |
| 2011/0138253 A1* | 6/2011 | Gunnam ....................... | 714/773 |

FOREIGN PATENT DOCUMENTS

| | | |
|---|---|---|
| CN | 1182932 A | 5/1998 |
| CN | 1801103 A | 7/2006 |
| CN | 101523504 A | 9/2009 |

(Continued)

OTHER PUBLICATIONS

International Search Report and Written Opinion dated Mar. 1, 2012 for Application No. PCT/IB2011/054164.

*Primary Examiner* — Albert Decady
*Assistant Examiner* — Enam Ahmed
(74) *Attorney, Agent, or Firm* — Cantor Colburn LLP

(57) ABSTRACT

In a solid state memory device, codewords stored in a unit of the memory device are decoded using an error correcting iterative decoding process. An average number of iterations needed for successfully decoding codewords of the unit is determined, and the average number of iterations is monitored. The average number of iterations can be taken as a measure of wear of the subject unit.

20 Claims, 4 Drawing Sheets

(56) References Cited

FOREIGN PATENT DOCUMENTS

| JP | 2005216301 A | 8/2005 |
|----|--------------|--------|
| JP | 2008108356 A | 5/2008 |
| JP | 2008192054 A | 8/2008 |
| JP | 2010505200 A | 2/2010 |
| WO | 2007084751 A2 | 7/2007 |
| WO | 2008004226 A2 | 1/2008 |

* cited by examiner

| Block ID | r | i | k |
|---|---|---|---|
| 123 | 1056 | 15 | 4002 |

| Device ID | R | I | K |
|---|---|---|---|
| 35 | 10656 | 156 | 10002 |

DECODING IN SOLID STATE MEMORY DEVICES

CROSS-REFERENCE TO RELATED APPLICATIONS

This is a U.S. national stage of application No.: PCT/IB2011/054164, filed Sep. 22, 2011. Priority under 35 U.S.C. §119(a) and 35 U.S.C. §365(b) is claimed from European Patent Application No. 10181705.4, filed Sep. 29, 2010, and all the benefits accruing therefrom under 35 U.S.C. §119, the contents of which in its entirety are herein incorporated by reference.

BACKGROUND

The present disclosure generally relates to storage systems comprising solid state memory devices such as flash based memory devices, and to techniques for controlling such solid state memory devices, in particular with a focus on decoding mechanisms for such solid state memory devices.

Solid-state memory devices encompass rewritable non-volatile memory devices which use electronic circuitry for storing data. Currently, solid-state memory devices start replacing conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance along with an appreciated robustness due to lack of moveable parts.

State-of-the-art solid-state drives (SSD)—which term is used equivalently to the term solid state memory device—may be embodied with single-level cells (SLC) for which binary quantization is performed to yield one bit of information, or with multi-level cells (MLC) for which quantization to one of several levels, usually four or eight, is performed to yield more than one bit of information.

Error-correction codes (ECC) may be applied to solid state drives to achieve the required reliability of the data retrieval process. Typically, Reed-Solomon (RS) or Bose-Chaudhuri-Hocquenghem (BCH) codes are used for that purpose, in conjunction with hard decoding algorithms. The main problem with hard decoding algorithms is that non-recoverable loss of information occurs whenever a quantization is performed on the physical value that is read back from a memory cell. To overcome the loss of information caused by hard decoding techniques, soft decoding of ECC has been recently proposed for SSDs. Soft decoding techniques are characterized by decoding a codeword within multiple iterations. It is known that soft decoding yields large coding gains compared to RS codes. However, iterative decoding introduces a latency associated with the decoding process, which may adversely affect the response time of SSD applications.

An iterative decoding technique is applied to a solid state memory device in WO 2007/084751 A2 in which the device includes, in part, an encoder, a multi-level solid state non-volatile memory array adapted to store data encoded by the encoder, and a decoder adapted to decode the data retrieved from the memory array. The memory array may be a flash EEPROM array. The memory unit optionally includes a modulator and a demodulator. The data modulated by the modulator is stored in the memory array. The demodulator demodulates the modulated data retrieved from the memory array.

Another iterative decoder is illustrated in US 2009/0024905 A1 in which the corresponding method for operating a memory device includes encoding data using an Error Correction Code (ECC) and storing the encoded data as first analogue values in respective analogue memory cells of the memory device. After storing the encoded data, second analogue values are read from the respective memory cells of the memory device in which the encoded data were stored. At least some of the second analogue values differ from the respective first analogue values. A distortion that is present in the second analogue values is estimated. Error correction metrics are computed with respect to the second analogue values responsively to the estimated distortion. The second analogue values are processed using the error correction metrics in an ECC decoding process, so as to reconstruct the data.

SUMMARY

According to an embodiment of a first aspect of the disclosure, there is provided a method for controlling a solid state memory device, comprising decoding codewords stored in a unit of the memory device using an error correcting iterative decoding process, determining an average number of iterations needed for successfully decoding codewords of the unit, and monitoring the average number of iterations.

In embodiments, the method may comprise one or more of the following features:

subject to the average number of iterations at least one of the following activities is triggered:
 modifying a mode the unit is operated in;
 applying a wear-levelling routine;
 no longer operating the unit;
 applying measures for preventing loss of data with respect to the unit;
 modifying one or more parameters used in the decoding process, and continue running the decoding process with the modified parameters;
 the monitoring of the average number of iterations includes comparing the average number of iterations to a threshold, and triggering at least one activity when the average number of iterations exceeds the threshold;
 the unit is marked when the average number of iterations exceeds the threshold;
 in the decoding process one of a maximum latency and a maximum number of iterations is defined after which the decoding process for decoding a codeword is terminated at latest, and the maximum latency or the maximum number of iterations respectively is increased when the average number of iterations exceeds the threshold;
 a maximum user bit error rate is defined with the user bit error rate being an error rate of codewords after having applied the error correcting iterative decoding process, and the maximum user bit error rate is increased when the average number of iterations exceeds the threshold;
 in the decoding process a number of quantization levels is applied in iterations for determining an a posteriori probability of a code symbol represented by a physical value stored in a cell of the memory device which number of quantization levels exceeds the number of code symbols available per cell;
 the average number of iterations of a unit is determined by accumulating the number of iterations needed for successfully decoding codewords of a unit for a predetermined number of readings from the block and by dividing the accumulated number of iterations by the predetermined number of readings;

the time needed for the predetermined number of readings is monitored;

the memory device comprises multiple units; the average number of iterations is determined for each of the units; and an average number of iterations for the device is determined by accumulating the average number of iterations of each of the units and by dividing the accumulated average number by the number of the units;

the device comprises a single unit.

According to an embodiment of another aspect of the present disclosure, there is provided a computer program product comprising a computer readable medium having computer readable program code embodied therewith, the computer readable program code comprising computer readable program code configured to perform a method according to any one of the preceding embodiments.

According to an embodiment of a further aspect of the present disclosure, there is provided a storage controller for controlling a solid state memory device, comprising a soft decoder configured to decode codewords stored in a unit of the memory device using an error correcting iterative decoding process, a computing unit configured to determine an average number of iterations needed for successfully decoding codewords of the unit, and a monitoring unit configured to monitor the average number of iterations.

In embodiments, the storage controller may comprise one or more of the following features:

the soft decoder includes multiple decoding units for decoding multiple codewords stored in the unit of the memory device in parallel by means of an error correcting iterative decoding process;

the soft decoder includes a single decoding unit for decoding a codeword stored in the unit of the memory device by means of an error correcting iterative decoding process, and a queue for storing consecutive codewords to be decoded.

According to an embodiment of another aspect of the disclosure there is provided a memory device comprising a solid state memory and a storage controller for controlling the solid state memory according to the storage controller aspects of the disclosure.

It is understood that method steps may be executed in a different order than listed in a method claim. Such different order shall also be included in the scope of such claim as is the order of steps as presently listed.

Embodiments described in relation to the aspect of the method shall also be considered as embodiments disclosed in connection with any of the other categories such as the device, the computer program product, etc., and vice versa.

BRIEF DESCRIPTION OF THE DRAWINGS

The disclosure and its embodiments will be more fully appreciated by reference to the following detailed description of presently preferred but nonetheless illustrative embodiments in accordance with the present disclosure when taken in conjunction with the accompanying drawings.

The figures are illustrating.

DETAILED DESCRIPTION OF THE EMBODIMENTS

Figure 1:
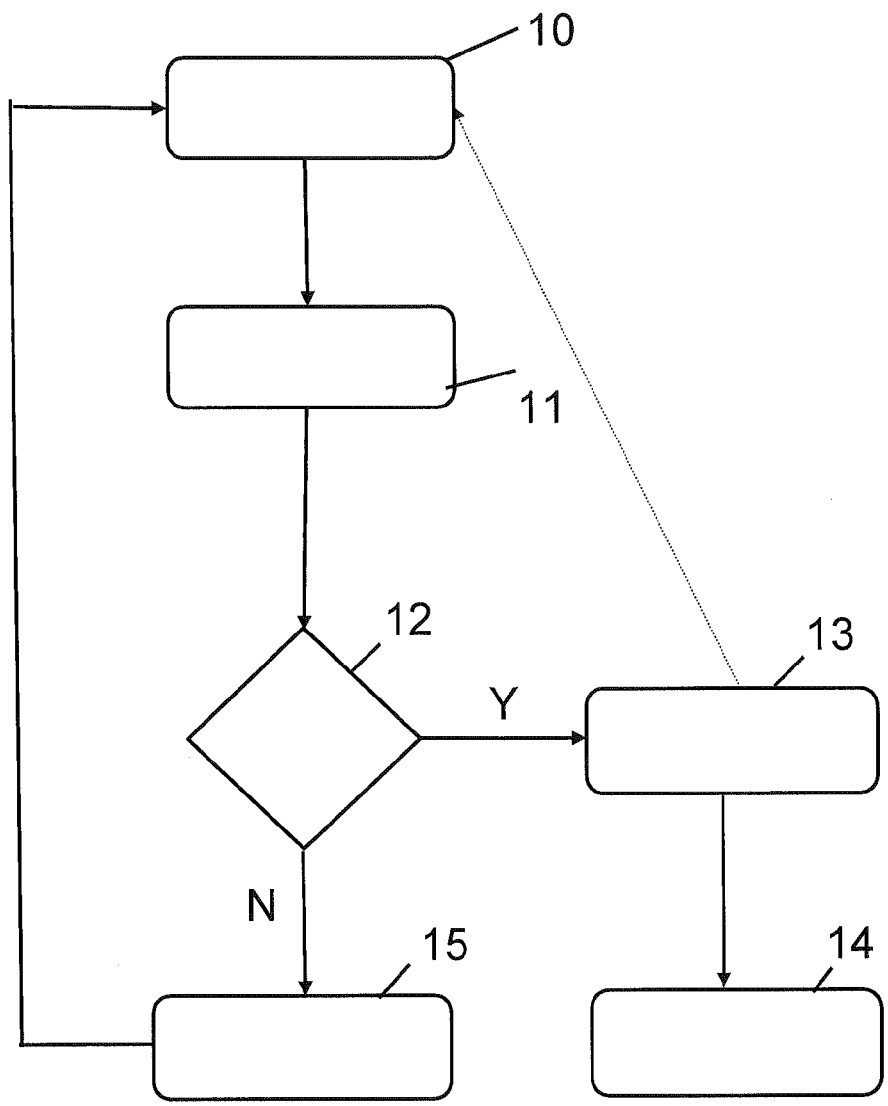
FIG. 1 a flow chart of a method for controlling a solid state memory device according to an embodiment of the present disclosure.

As an introduction to the following description, it is first pointed at a general aspect of the disclosure, concerning the way a solid state memory device is controlled, typically by means of a storage controller. Codewords stored in a unit of the memory device are decoded by means of an error correcting iterative decoding process. An average number of iterations needed for successfully decoding codewords of the unit is determined. Such average number of iterations is monitored.

The idea is based on the insight that when applying a soft decoding process to codewords stored in the memory device by means of an appropriate error correction code which allows for iterative decoding meaningful information can be derived from the decoding operations for a very different subject matter in solid state memory devices which is wear.

Flash and other solid state memory devices such as phase change memory devices suffer from a limited lifetime owed to the physics of the device in form of wear. In particular, flash memory devices have a finite number of write-erase cycles before the storage integrity begins to deteriorate and data can neither be safely read nor written. Such maximum number of write-erase cycles that can be performed on each block before it wears out is called endurance. After a block experiences a certain level of wear, which may vary significantly from block to block, performance quickly degrades. Endurance may typically be in the order of 100000 for SLC and 10000 for MLC assuming a ten-year data retention which data retention refers to the maximum time period for which data can be read out from the device, possibly with correctable errors.

In addition, wear in solid state memory devices is partly accelerated due to the way these devices are operated. For example, NAND Flash memory is organized in units of blocks and sub-units of pages. Multiple pages form a block. While read and write operations can be applied to pages as a smallest unit of such operation, erase operations can only be applied to entire blocks. And while in other storage technologies outdated data can simply be overwritten by new data, flash technology requires an erase operation before new data can be written to an erased block. For the reason that in flash technology erase operations take much longer than read or write operations, a writing technique is applied called "write out of place" in which new or updated data is written to some free page offered by a free page allocator instead of writing it to the same page where the outdated data resides. The page containing the outdated data is an invalid page. At some point in time, a process called "garbage collection" frees blocks for new writes by moving the content of all valid pages of a block to free pages at different blocks. As a result, the subject block finally comprises invalid pages only and can be erased. It is apparent that this write out of place procedure requires some additional internal write operations which effect is called "write amplification" which in turn amplifies wear of the device. Monitoring wear in a solid state memory device is important for preventing data from being lost due to worn out blocks.

It was found, that the average number of iterations required for the decoding of codewords when applying an iterative error correcting decoding process is representative for the level of wear the respective unit exhibits. In other words, the average number of iterations required for successfully decoding codewords is a measure for wear of the unit. By way of monitoring the average number of iterations, the wear of a unit can be monitored, and subject to the average number of iterations determined action can be taken.

For low wear levels under normal usage, good block/unit performance translates into very few iterations needed to declare successful decoding, and hence also little decoding latency is experienced. As the wear or the time period since the last write operation of a block increases, performance deteriorates and more iterations are required for successful decoding. The average number of iterations for successful decoding of codewords that are stored in a block is then adopted as a measure of wear level.

In decoding algorithms for error correcting codes (ECC) where hard decoding in form of hard decisions are used instead of soft decoding, a quantization is performed on the physical value stored in a cell of the memory device that represents and shall be translated into a code symbol. Given that for example the physical value is a voltage stored in the cell, a quantization level may be a certain voltage that represents one of the possible binary values assumed by the code symbols that are encoded in the cell. Therefore the number of quantization levels for hard decoding typically is equal to the number of possible binary values assumed by the code symbols. For example, in a four-level cell of a flash memory device two binary code symbols are typically encoded, and a four-level quantizer is used for hard detection. The recovered sequence of code symbols obtained by quantization shall represent the original sequence of information bits. For example, Reed-Solomon (RS) or Bose-Chaudhuri-Hocquenghem (BCH) codes are commonly used in conjunction with hard decoding algorithms in flash memories.

The main problem with hard decoding is that non-recoverable loss of information occurs whenever a hard quantization is performed on a physical value that may represent one or more code symbols. To overcome this problem, soft decoding of ECC may be applied. In soft decoding algorithms, a physical value that may represent one or more code symbols is ideally input to a decoder without prior quantization in the spirit of hard coding where a final decision is taken with respect to the few quantization levels given. In the practice of soft decoding, a quantization is applied with a number of quantization levels that is significantly larger, e.g. eight times larger, than the number of possible binary values assumed by the code symbols that are represented by the physical value. Therefore, soft decoding is characterized by approaching iteratively to a decision which code symbol binary value is represented by a physical value by usage of a number of quantization levels increasing the number of code symbols by far. For a certain class of codes the achievable coding gains are substantially increased if iterative soft decoding algorithms are applied. Iterative soft decoding schemes usually apply a message-passing procedure between two soft decoding components/logics, so that each component uses the soft information from the other component to produce more reliable decisions. By applying a soft decoding process the non-recoverable loss of information can be avoided compared to hard decoding.

Hence, in the context of the present disclosure, soft decoding refers to a decoding process making use of a number of quantization levels in various iterations for determining a code symbol binary value represented by a physical value stored in a cell of the memory device. In such process, the number of quantization levels exceeds the number of possible binary values assumed by the code symbols available per cell. Preferably, the number of quantization levels exceeds the number of possible binary values assumed by the code symbols available per cell by eight at least. In a preferred embodiment, soft decoders for decoding turbo codes or low-density parity check (LDPC) codes are applied. Preferably, when writing data to the device the data is encoded by the corresponding error correction code, preferably a turbo code or a low-density parity check (LDPC) code, that can be decoded by the soft decoder.

To mitigate the wear problem in solid state memory devices, unequal error protection for blocks with different wear levels has been proposed. This is no longer needed for the reason that by means of soft decoding all blocks can be treated by the same error correcting codes which are the iterative codes as proposed as the level of wear can be derived early or implied in the average number of iterations.

Subject to the average number of iterations, an internal management process performed by flash controllers called wear levelling may be applied. This process addresses the wear-out characteristics of the memory device. Wear-levelling involves various data placement and movement functions that aim to distribute write-erase cycles evenly among all available units to avoid uneven wear, so lengthening overall lifespan. In particular, wear-levelling functionality governs selecting blocks to which new data should be written and also moving stored data within the flash memory to release blocks with low cycle counts and even out wear. Such wear levelling process may be triggered by a specific number or range of average iterations identified. There is no longer a need for separately establishing means for determining wear such as by counting write-erase cycles per unit. The measure of wear implied in the average number of iterations can be taken as a trigger and/or as wear estimate input for a wear levelling process.

Summarizing, the number of iterations required for the soft decoding of codewords that are stored in a unit using iterative codes such as turbo codes or LDPC codes is monitored. For low wear levels under normal usage, good unit performance translates into very few iterations needed to declare successful decoding, and hence also little decoding latency is experienced. As the wear or the time period since the last write operation of a block increases, performance deteriorates and more iterations are required for successful decoding. The average number of iterations for successful soft decoding of codewords that are stored in a block is then adopted as a measure of wear level.

FIG. 1 shows a flow chart of a method for controlling a solid state storage device according to an embodiment of the disclosure. In step 10, codewords stored in a unit, e.g. a block of a flash based memory device, are decoded by means of an error correcting iterative decoding process. In step 11, an average number of iterations needed for successfully decoding codewords in the unit is determined based on the decoding of multiple codewords in step 10 which is equivalent to multiple reading processes. In step 12, the average number of iterations is monitored in that it is compared to a threshold. If the average number of iterations is below the threshold (N), the process starts from new in step 10 until a sufficient number of reads are performed that enable to build an average number of iterations according to the requirements in step 11.

If the average number of iterations is above the threshold in step 12 (Y), then one or more activities may be applied in step 13: Such activities may include one or more of:
- modifying a mode the unit is operated in;
- applying a wear-levelling routine;
- causing the unit no longer to be operated;
- initiating measures for preventing loss of data with respect to the unit;
- modifying one or more parameters used in the decoding process, and continue running the decoding process with the new parameters.

The above list neither is exhaustive, nor do all the different activities need to be offered in the device at the same time.

Specific examples of activities initiated subject to the average number of iterations, preferably when the average number exceeds a threshold, may be as follows:

With respect to a wear levelling threshold the average number exceeds, wear levelling processes may be started for balancing out wear distribution across multiple blocks with the present block included. If, for example, the average number of iterations and the corresponding wear levelling threshold indicate a relatively high level of wear in the present block, any new data arriving may be caused to be written to different blocks exhibiting a lower level of wear. It may also be understood as a mode in operation, if for example, triggered by exceeding the threshold for the future only read operations may be allowed on the present block but no write or erase operations.

Changing the mode of operation as a result of monitoring the average number of iterations may affect e.g. the reading of data, the writing of data, erasing operations, encoding and/or decoding operations, garbage collection, other administrative tasks, etc. In summary, any current operational process that may be departed from and/or changed in view of the identified wear shall fall within a change of the mode of operation.

If, for example, the average number of iterations exceeds a stop threshold indicating a very high level of wear, all operations may be stopped on the present block, e.g. after a fail-safe routine is applied for preventing loss of valid data from the present block, and the block no longer will be in use.

In a preferred embodiment, some of the activities set out above may be initiated subsequently or in parallel; thresholds for different activities may differ in their value.

According to the preferred method in FIG. 1, the block for which the average number of iterations exceeds the threshold is marked for no longer being usable and/or being unreliable. In such case, or in step 14 any operation on the present block may be stopped.

With activities other than stopping operation being the preferred choice, such as e.g. modifying decoding parameters, the decoding process may continue at step 10, see dotted line, and a new cycle of read operations including associated decoding is run in order to determine a new average number of iterations in step 11, however, now with modified decoding parameters applied.

The flow chart of FIG. 1 illustrates that as the wear of a block increases, cell performance deteriorates, and more iterations are required for successful decoding. When the average number of iterations required for successful decoding exceeds a threshold, which may be set relative to the normal operation at an initial phase during which cells are not worn out, the block may be declared unreliable and is no longer used.

Figure 2:
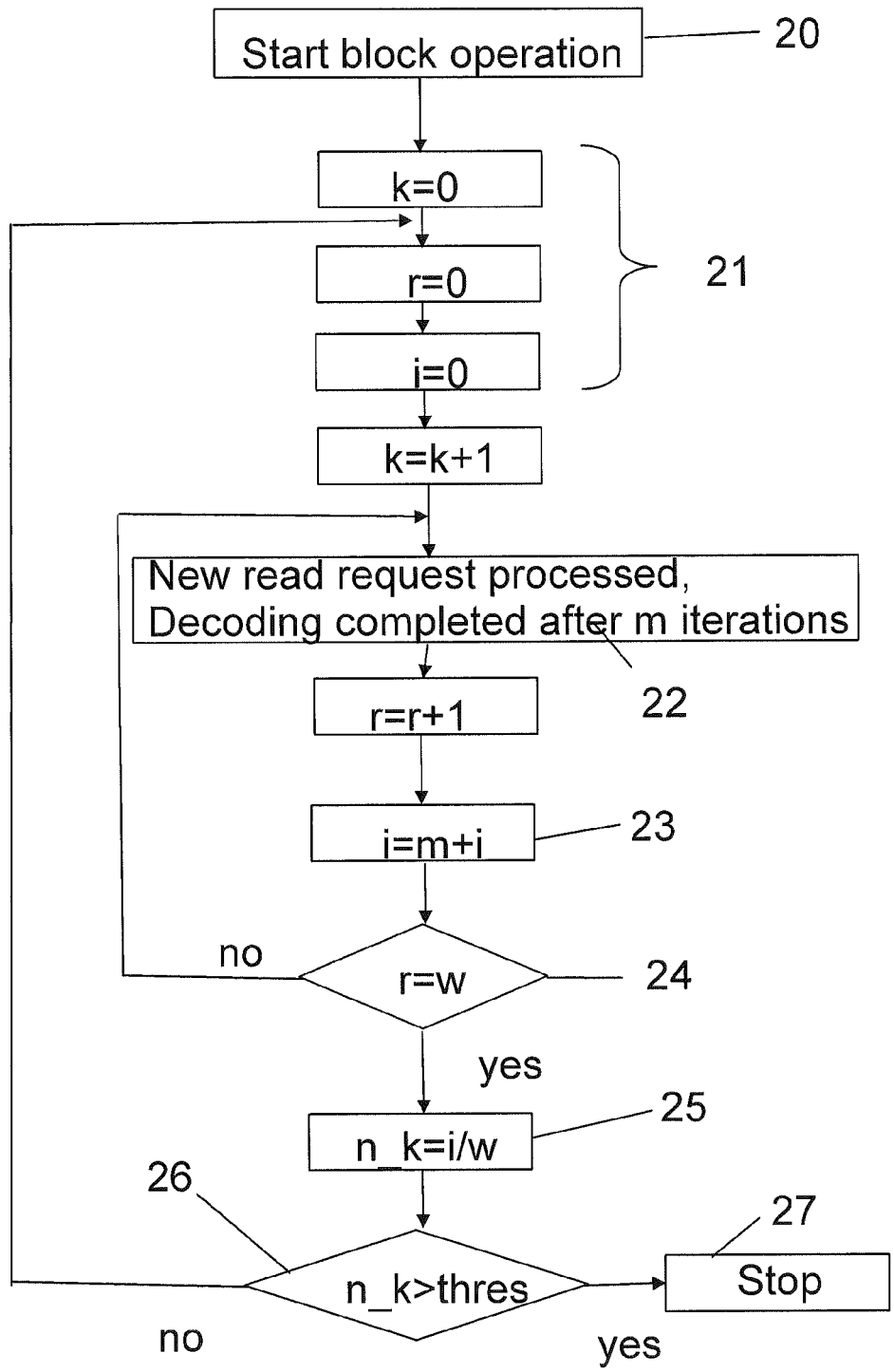
FIG. 2 a flow chart of a method for controlling a solid state memory device according to an embodiment of the present disclosure.

FIG. 2 illustrates a flow chart according to another embodiment of the present disclosure, where again the number of iterations required by a soft decoding algorithm to generate its output upon a read request is monitored.

At the block level—a block may be the unit of a flash memory device the present method is applied to—the operation is started in step 20 and various counters <k>, <r>, and <i> are set to zero, see collectively step 21. A predetermined window of size "w" is introduced, which considers "w" successive reads in the block. This can be implemented through the counter <r> in a per-block register, which is incremented upon each read operation in the block, and reset in step 21 when "r" reaches "w" in step 24. Upon reset, the counter <k>, which represents the index of the window "w", is incremented in the per-block register. The further counter <i> is implemented in the per-block register, which is incremented in step 23 according to the number of iterations "m" required to produce the outcome upon a read operation in the block in step 22. In this sense, the counter <i> accumulates the number of iterations needed in the decoding processes to support the various read operations. This counter <i> is reset when "r" reaches "w", see step 21. Before resetting it, the value of counter <i> may be stored in another counter location <i_previous> in the per-block register, which is not shown in the flow chart of FIG. 2. Thus, the first "w" reads form the first window, denoted by w_1, the subsequent "w" reads form the second window, denoted by w_2, and so forth. Consequently, window w_k contains the (k−1)*w+1, (k−1)*w+2, ..., k*w sequence of w successive reads. After "r" has reached "w", the average number of iterations n_k required is calculated in step 25 based on the above as follows:

Average number of iterations n_k in window w_k: $n\_k = i/w$.

Such average number of iterations n_k now is monitored by way of comparing to a threshold "thres" in step 26. In case the average number n_k is above the threshold "thresh" (yes), the process is stopped in step 27 and, in the present embodiment, the respective block is marked as unusable. Other activities may be initiated in combination with step 27, too, as appropriate.

In case the average number of iterations n_k is below the threshold "thresh" in step 26, the process starts again in step 21 for a new window k+1 of "w" reads, for which the average number of iterations is determined in step 25 and monitored in step 26.

Optionally, in combination with the determination of the average number of iterations n_k, a rate of change in the average number of iterations may be calculated as follows:

Average number of iterations in window w_(k−1): $n\_(k-1) = i\_previous/w$.

Variation of the average number of iterations d_k in window w_k: $d\_k = n\_k - n\_(k-1)$.

The sequence d_k may be used to estimate the rate of change of wear in the device. Appropriate actions may additionally be taken if d_k exceeds a predetermined threshold.

The issue of data retention can also be addressed according to another embodiment. Data retention refers to the maximum time period during which stored data can be read out, possibly with correctable errors. Recall that a read problem may arise due to data corruption not because of wear, but owing to the long period that data has been stored without being updated. In particular, referring to the method described above, a typical window contains w read operations, with information about the number of iterations that have been performed for decoding, but without notion of time. In order to distinguish retention from wear-out an additional counter may be provided for indicating the age of the corresponding window, i.e. for how long the window is active. In case the age of the window exceeds a retention threshold and the average number of iterations exceeds that assigned threshold, it can be assumed that a possible loss of data in such block may not stem from wear but from data retention. Other or additional measures may be implemented as a result of monitoring for how long the window is active, for example relocate the valid data of the block in case the age of the window exceeds a retention threshold.

The approach as illustrated in FIG. 2 can also be extended for detecting when an entire memory device wears out. One possible implementation is described below and constitutes an analogon to the determination of the average number of iterations on the block level, however, transferred to the device level where the counters are implemented for counting the iterations of any read process in the device. Hence, the numbers of iterations at the device level are counted through per-device counters. In particular, a window of size "W" is introduced, which considers W successive reads in the device. This can be implemented through a counter <R> in the per-device register, which is incremented upon each read operation in the device, and reset when "R" reaches "W". Upon reset, another counter <K>, which represents the index of the window, is incremented in the per-device register. A further counter <I> is implemented in the per-device register, which is incremented according to the number of iterations required to produce the outcome upon a read operation in any block. This counter <I> is reset when "R" reaches "W". Before resetting it, the value of counter <I> may be stored in another counter location <I_previous> in the per-device register. Thus, the first W reads form the first window are denoted by W_1, the subsequent W reads form the second window are denoted by W_2, and so forth. Consequently, window W_K contains the (K−1)*W+1, (K−1)*W+2, . . . , K*W sequence of W successive reads. The average number of iterations required and its rate of change are calculated based on the above as follows:

Average number of iterations N_K in W_K: N_K=I/W.

Average number of iterations in W_(K−1): N_(K−1)=I_previous/W.

Variation of the average number of iterations D_K in W_K: D_K=N_K−N_(K−1).

The determination of the average number of iterations on the device level may be implemented in addition to a determination on the block level or instead. In observing the wear out on device level, any activities initiated upon the average number of iterations on the device level exceeding a threshold may be device specific, e.g. by marking the device as worn out and/or preventing any further write and/or erase operations to be applied to the device.

In another embodiment, the determination of the average number of iterations may be performed on each block of the device. In addition, for determining the average number of iterations on the device level, the average number of iterations determined for all blocks may be accumulated. In one embodiment, operations on each individual block may be stopped or amended if the average number of iterations for the specific block exceeds the threshold, and operations on the entire device may be stopped or amended if the accumulated number of iterations exceeds a threshold, which threshold may be set to the same value as the block level threshold, or may be set to a different value, specifically to a lower value. Operations on the entire device may also be stopped if the number of blocks that are declared unusable exceeds a threshold.

Figures 3, 4:
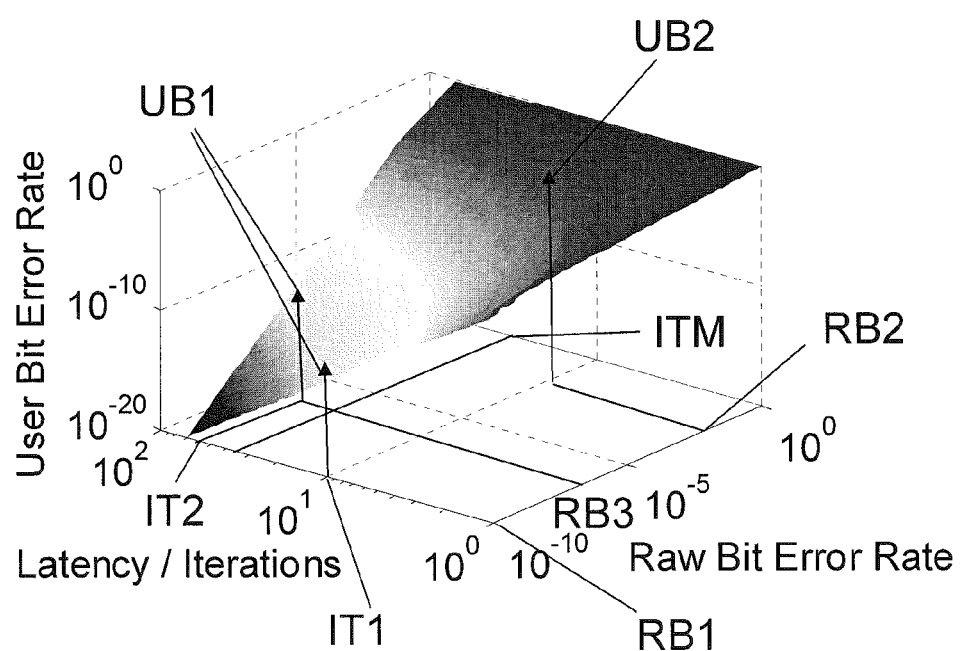
FIG. 3 two tables illustrating an exemplary status of various counters used in the method of FIG. 2.
FIG. 4 a diagram illustrating the relationship between a raw bit error rate, a user bit error rate, and latency/iterations in the decoding process.

A typical snapshot of the content of a per-block and a per-device register is shown in the table of FIG. 3 for a sample block ID and a sample device ID. Sample counter values are shown for counters k, r, i, K, R, I which correspond to the counters introduced with respect to FIG. 2.

FIG. 4 illustrates a broader context of the present method and device by means of a 3D diagram with a raw bit error rate depicted on the x-axis, latency/iterations on the y-axis, and a user bit error rate on the z-axis. The raw bit error rate characterizes the bit error rate in the data stored in the memory, i.e. the bit error rate stored codewords would exhibit if no error correction were applied. For the reason that an error correction code is applied, the bit error rate may be improved by means of the error correction code, and the user bit error rate denotes the bit error rate still left after decoding the error correction coded data. For the reason that a code is used which makes use of an iterative decoding approach, the latency/iterations may denote either the duration needed for a successful decoding of a codeword or the number of iterations needed for successfully decoding a codeword. Note that in the present diagram the number of iterations denotes the number needed for decoding an individual codeword rather than an average number determined over multiple decoding.

Given that in the present example, the solid state memory device is a flash memory device, an embodiment of the proposed method makes use of samples of an analogue signal read back V(T), i.e. voltage over time, from a cell in the flash memory device. As the wear in the respective block increases, the raw bit error rate, i.e., the error rate applicable to individual symbol decisions prior to error correction also increases resulting in an increase of the number of iterations required for decoding. To maintain a limited latency for allowing the device to continue operation even if a code symbol cannot be successfully decoded, the number of iterations performed for decoding a codeword preferably is bounded. Therefore, for a given latency or maximum number of iterations allowed, for increasing wear the user bit error rate increases as the raw bit error increases. Note that when the raw bit error rate increases, a specified user bit error rate can be maintained at the expense of increased number of iterations, and hence decoding latency. Towards the end of the device lifetime, the number of iterations for successfully decoding a codeword is close to the maximum number of iterations allowed. At that point, i.e. for example when the average number of iterations exceeds a first threshold which first threshold is lower than the maximum number of iterations allowed, the maximum number of iterations allowed may be set to a higher value, and thus be increased exceptionally for maintaining reliability, i.e. maintaining a specified user bit error rate. In a second step, when the average number of iterations exceeds a second threshold which preferably may exceed the first threshold the block or device may be marked and in doing so declared as unreliable and no longer usable. If the second threshold is set to a value equal to the initial maximum number of iterations allowed a block may be declared unreliable when a target user bit error rate cannot be achieved within the maximum allowed number of decoder iterations in average.

In the diagram of FIG. 4, over the lifetime of the device the wear of the subject block increases which, for example results in an increase of the raw bit error rate from RB1 to RB2. In case, a number of iterations needed for successfully decoding a codeword with the raw bit error rate of RB1 would be limited to IT1, it becomes apparent from the diagram the user bit error rate UB1 associated with RB1 and IT1, which is a measure for the bit errors that are not correctable despite the error correction code, increases to UB2. However, in case the maximum number of iterations allowed ITM has a higher value than IT1, there is a chance in sticking to the user bit error rate UB1 which may be a target user bit error rate specified for the operation of the device by running a number of iterations exceeding IT1 but remaining less than ITM. In case, if average number of iterations exceeds a threshold, the maximum number of iterations may exceptionally be allowed to be set to IT2 which exceeds ITM for allowing the target user bit error rate remain at UB1 at least for raw bit error rates less than RB3. In other words, it is possible to choose various tradeoffs between block lifetime and decoding latency, as illustrated qualitatively in FIG. 4.

Figure 5:
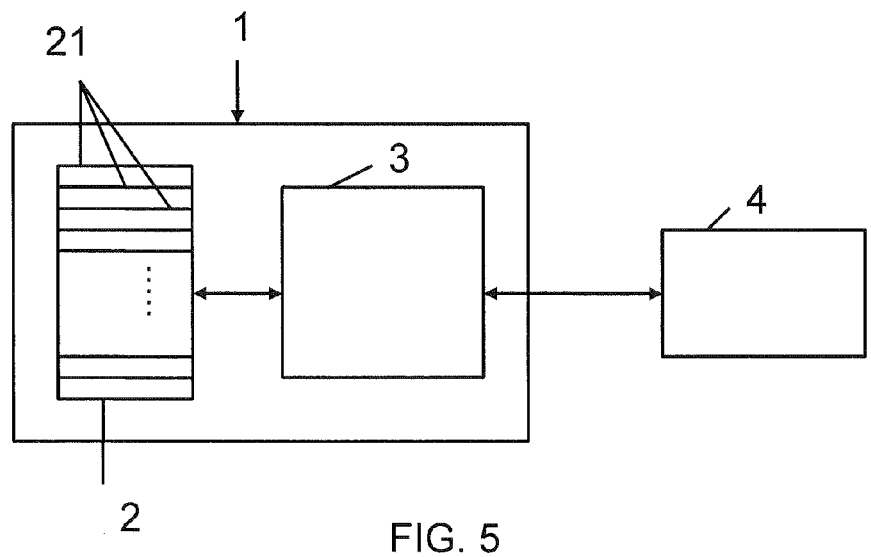
FIG. 5 a block diagram of a storage device according to an embodiment of the present disclosure.

FIG. 5 shows a block diagram of a memory device according to an embodiment of the present disclosure. The memory device 1 includes a flash based solid state memory 2 with a block/page memory space structure. Few of the blocks are indicated as 21. A memory controller 3 is controlling the activities of the flash memory 2—as such the memory can be described as a computerized memory. The memory controller 3 may also be denoted as storage controller. The memory controller 3 is specifically adapted for writing data to and reading data from the memory 2 including encoding and decoding, and for executing all administrative tasks in connection with the reading and writing of data. The memory controller 3 further is connected to a host 4 which makes use of the storage device 1 for storing data. Hence, the host 4 issues read and/or write commands to the storage device 1.

Figure 6:
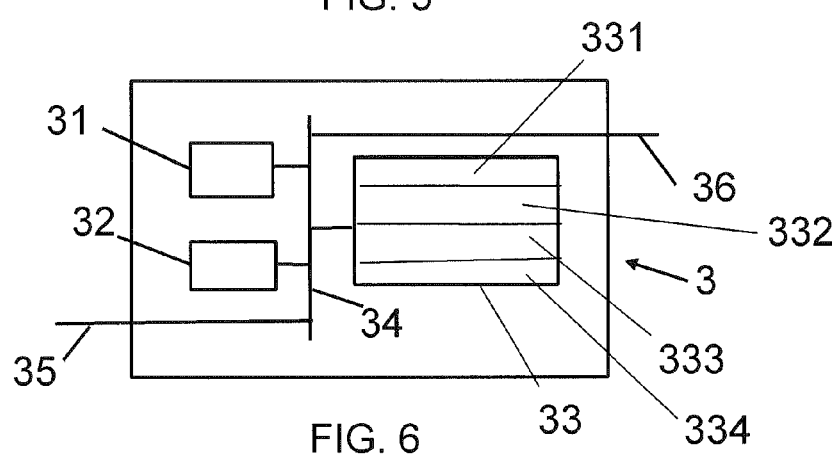
FIG. 6 a block diagram of a memory controller according to an embodiment of the present disclosure.

In order to implement the method according to any one of the embodiments as described above, the memory controller 3 preferably provides a computer program code preferably stored in a non-volatile, non-rewritable storage medium such as a ROM 31 see FIG. 6. The memory controller further provides a RAM 32 for loading the program code into, and a processing unit 33 for executing the program code in the RAM 32. The processing unit 33 comprises functional units such as a soft decoder 331 for soft decoding according to the method described, a computing unit 332 for determining an average number of iterations needed in the decoding process of several read commands, and a monitoring unit 333 in which, for example, the average number of iterations is compared to a threshold. The present processing unit 33 comprises a single soft decoder which is fed with codewords to be decoded by a queue 334. In addition, internal communication systems 34 are provided for communicating between the components of the memory controller 3, and an interface 35 is provided for communicating with the flash memory, while another interface 36 may be provided for any communication with the host.

In a preferred embodiment, LDPC codes are implemented as error correction codes, and iterative soft decoding is applied for data retrieval in the soft decoder 331. A critical parameter is the latency associated with the decoding process. The average number of iterations for the decoding of codewords, which are stored in a block, is monitored. For acceptable wear levels, the response is expected to be provided within 20 iterations for codeword lengths of up to 5000 bits. Assuming that each iteration is performed in 1 us, the response time would be at most 20 us, which is within the acceptable limits for proper SSD operation. Alternatively to the above hardware set-up of the soft decoder 331 with only one logic for iterative decoding plus a queue for storing consecutive read requests, in which set-up the implementing complexity is reduced at the expense of larger latency, alternatively there may be a set-up implementing the iterative decoding by replicating the logic needed for decoding n codeword at a time, such that read requests can be processed in parallel, thus resulting in low latency.

Figure 7:
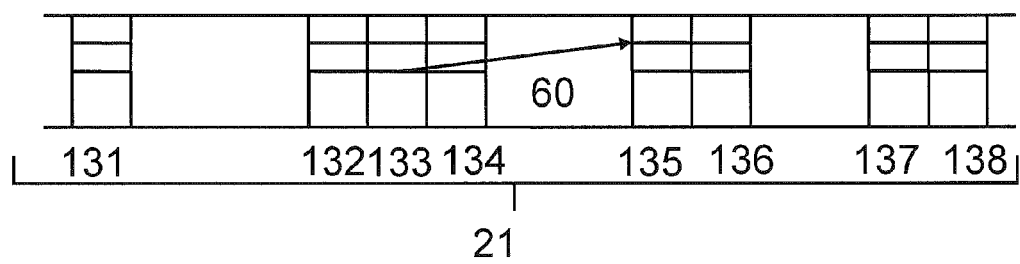
FIG. 7 a schematic illustration of a portion of the memory space of a flash based memory device.

Finally, FIG. 7 illustrates a part of a flash memory organized in blocks 21 of which few blocks 131 to 138 are explicitly shown. Pages are indicated as horizontal stripes in a column like illustrated block. All the blocks 131 to 138 are data blocks adapted for holding user data. In the present example, it is assumed that block 133 is determined to exhibit wear above an acceptable threshold. As a result, and as indicated by an arrow 60 in FIG. 7, the valid pages of the block are copied to another block, i.e. block 135 in the present example, which block currently supports the writing of new or updated data. After such data saving the block 133 is marked as no longer being in use.

As will be appreciated by one skilled in the art, aspects of the present disclosure may be embodied as a system, method or computer program product. Accordingly, aspects of the present disclosure, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for controlling a solid state memory device, comprising:
   decoding codewords stored in a unit of the memory device using an error correcting iterative decoding process;
   determining an average number of iterations needed for successfully decoding codewords of the unit by:
      setting a plurality of counters to zero,
      introducing predetermined window of a first size,
      incrementing a first counter upon each read operation, and
      in response to the first counter matching the first size of the predetermined window, calculating the average number of iterations in the predetermined window;
   monitoring the average number of iterations, the monitoring of the average number of iterations includes comparing the average number of iterations to the threshold; and
   triggering at least one activity in response to the average number of iterations exceeding the threshold, the at least one activity increasing a lifetime of the solid state memory device or reducing a decoding latency of the error correcting iterative decoding process.

2. A method according to claim 1, wherein the at least one activity is selected from a list of activities comprising:
   modifying a mode the unit is operated in;
   applying a wear-levelling routine;
   no longer operating the unit;
   preventing loss of data with respect to the unit; and
   modifying one or more parameters used in the decoding process, and continue running the decoding process with the modified parameters.

3. A method according to claim 1, wherein the unit is marked when the average number of iterations exceeds the threshold.

4. A method according to claim 1,
   wherein one of a maximum latency and a maximum number of iterations (ITM) is defined after which the decoding process for decoding a codeword is terminated at latest, and
   wherein the maximum latency or the maximum number of iterations (ITM) respectively is increased when the average number of iterations exceeds the threshold.

5. A method according to claim 1,
   wherein a maximum user bit error rate is defined with the user bit error rate being the error bit rate of codewords after having applied the error correcting iterative decoding process,
   and wherein the maximum user bit error rate is increased when the average number of iterations increases.

6. A method according to claim 1, wherein in the decoding process a number of quantization levels is applied in iterations for determining an a posteriori probability of a code symbol binary value represented by a physical value stored in a cell of the memory device which number of quantization levels exceeds the number of code symbols available per cell.

7. A method according to claim 1, wherein the average number of iterations of a unit is determined by accumulating the number of iterations needed for successfully decoding codewords of a unit for a predetermined number of readings from the unit and by dividing the accumulated number of iterations by the predetermined number of readings.

8. A method according to claim 7, wherein the time needed for the predetermined number of readings is monitored.

9. A method according to claim 1,
   wherein the memory device comprises multiple units,
   wherein the average number of iterations is determined for each unit, and
   wherein an average number of iterations for the device is determined by accumulating the average number of iterations of each of the units and by dividing the accumulated average number by the number of the units.

10. A method according to claim 1, wherein the device comprises a single unit.

11. A computer program product comprising a non-transitory computer readable medium having computer readable program code embodied therewith, the computer readable program code comprising computer readable program code configured to perform a method according to claim 1.

12. A method according to claim 1, wherein the at least one activity includes:
performing the decoding of the codewords using the error correcting iterative decoding process in parallel to reduce the decoding latency of the error correcting iterative decoding process.

13. A method according to claim 1, wherein the at least one activity includes:
selecting blocks of the solid state memory with low cycle counts to even out wear of the solid state memory to increase the lifetime of the solid state memory device.

14. A method according to claim 1, wherein with respect to the determining of the average number of iterations needed for successfully decoding codewords of the unit, further comprising:
accumulating a number of iterations needed in the decoding processes to support various read operations.

15. A controller for controlling a solid state memory device, comprising:
a decoder configured to decode codewords stored in a unit of the memory device using an error correcting iterative decoding process;
a computing unit configured to determine an average number of iterations needed for successfully decoding codewords of the unit by:
setting a plurality of counters to zero,
introducing predetermined window of a first size,
incrementing a first counter upon each read operation, and
in response to the first counter matching the first size of the predetermined window, calculating the average number of iterations in the predetermined window; and a monitoring unit configured to monitor the average number of iterations by comparing the average number of iterations to the threshold and triggering at least one activity in response to the average number of iterations exceeding the threshold,
wherein the at least one activity increases a lifetime of the solid state memory device or reduces a decoding latency of the error correcting iterative decoding process.

16. A controller according to claim 15, wherein the decoder (331) includes multiple decoding units configured to decode multiple codewords stored in the unit of the memory device in parallel each using an error correcting iterative decoding process.

17. A controller according to claim 15,
wherein the decoder includes a single decoding unit configured to decode a codeword stored in the unit of the memory device using an error correcting iterative decoding process, and
wherein a queue is configured to store consecutive codewords to be decoded by the decoder.

18. A memory device comprising a solid state memory and a storage controller according to claim 15 for controlling the solid state memory.

19. A controller according to claim 15, wherein the at least one activity includes:
performing the decoding of the codewords using the error correcting iterative decoding process in parallel to reduce the decoding latency of the error correcting iterative decoding process.

20. A controller according to claim 15, wherein the at least one activity includes:
selecting blocks of the solid state memory with low cycle counts to even out wear of the solid state memory to increase the lifetime of the solid state memory device.

\* \* \* \* \*